(12) United States Patent
Oton

(10) Patent No.: US 12,111,190 B2
(45) Date of Patent: Oct. 8, 2024

(54) HIGH SAMPLING RATE OPTICAL FIBER SENSOR

(71) Applicant: SCUOLA SUPERIORE DI STUDI UNIVERSITARI E DI PERFEZIONAMENTO SANT'ANNA—ISTITUTO TECIP, Pisa (IT)

(72) Inventor: Claudio Oton, Pisa (IT)

(73) Assignee: SCUOLA SUPERIORE DI STUDI UNIVERSITARI E DI PERFEZIONAMENTO SANT'ANNA—ISTITUTO TECIP, Pisa (IT)

( * ) Notice: Subject to any disclaimer, the term of this patent is extended or adjusted under 35 U.S.C. 154(b) by 199 days.

(21) Appl. No.: 17/798,244

(22) PCT Filed: Feb. 12, 2021

(86) PCT No.: PCT/IB2021/051166
§ 371 (c)(1),
(2) Date: Aug. 8, 2022

(87) PCT Pub. No.: WO2021/161235
PCT Pub. Date: Aug. 19, 2021

(65) Prior Publication Data
US 2023/0075887 A1   Mar. 9, 2023

(30) Foreign Application Priority Data

Feb. 14, 2020   (IT) ................. 102020000002956

(51) Int. Cl.
*G01D 5/353*   (2006.01)
(52) U.S. Cl.
CPC ..... *G01D 5/35316* (2013.01); *G01D 5/35312* (2013.01); *G01D 5/35322* (2013.01)

(58) Field of Classification Search
None
See application file for complete search history.

(56) References Cited

U.S. PATENT DOCUMENTS 5,680,489 A * 10/1997 Kersey ................ G01M 11/086
                                                            385/12
2020/0033186 A1   1/2020 Yang et al.

FOREIGN PATENT DOCUMENTS

EP        3 290 870        3/2018

OTHER PUBLICATIONS

International Search Report dated Jun. 1, 2021 issued in PCT International Patent Application No. PCT/IB2021/051166, 3 pp.
(Continued)

*Primary Examiner* — Chad H Smith
(74) *Attorney, Agent, or Firm* — NIXON & VANDERHYE P.C.

(57) ABSTRACT

An optical fiber sensor includes optical sensor elements, for instance a plurality of multiplexed Bragg gratings, a broadband optical source, an interferometer with at least one polarization-maintaining fiber section with which a birefringence modulator, a signal generator and a receiver are associated. The optical birefringence in the propagation medium, i.e., in the polarization-maintaining fibre, combined with the birefringence of the birefringence modulator, produce in the interferometer the path difference and thereby the interference fringes which, appropriately processed according to the known technique, allow the measurement to be traced. The use of a birefringence modulator associated with the polarization-maintaining fiber allows a high-speed modulation of the interferometer, thus allowing high sampling rates of the sensor without having variations in responsivity depending on the alignment of the sensors with the interferential fringes of the interferometer.

10 Claims, 3 Drawing Sheets

(56) References Cited

OTHER PUBLICATIONS

Chung, Seunghwan et al., "A Fiber Bragg Grating Sensor Demodulation Technique Using a Polarization Maintaining Fiber Loop Mirror," IEEE Photonics Technology Letters, vol. 13, No. 12, Dec. 2001, pp. 1343-1345.

Fallon, R. W. et al., "All-Fibre Optical Sensing System: Bragg Grating Sensor Interrogated by a Long-Period Grating," Measurement Science and Technology, 9 (12), 1998, pp. 1969-1973.

* cited by examiner

HIGH SAMPLING RATE OPTICAL FIBER SENSOR

This application is the U.S. national phase of International Application No. PCT/IB2021/051166 filed Feb. 12, 2021 which designated the U.S. and claims priority to Italian Patent Application No. 102020000002956 filed Feb. 14, 2020, the entire contents of each of which are hereby incorporated by reference.

TECHNICAL SECTOR

The present invention pertains to the field of optical fiber sensors, and in particular to those sensors suitable for responding to perturbations with a change in the wavelength with which they reflect incident light, such as Bragg grating sensors or Fabry-Perot sensors.

STATE OF THE ART

Bragg grating sensors or Fabry-Perot sensors are highly versatile optical sensors as they respond well to many types of perturbations such as temperature variations, mechanical stresses, vibrations, pressure and more. They have several advantages over electronic sensors, such as immunity to electromagnetic interference, small size, ease of multiplexing along a single fiber and the fact that they are completely passive at the point where the parameters are to be measured.

A limitation of optical Bragg grating sensors and Fabry-Perot sensors is the sampling rate. This lies in the technology adopted for the portion of the sensor known as the interrogator. Since the sensor element is completely passive, it requires an interrogator to extract the reading taken at the measurement point. Typically, commercial interrogators are based on spectral analysis performed over a wide bandwidth so that many sensor elements can be read at the same time through wavelength division multiplexing (WDM). In commercial interrogators, the above spectral analysis is performed using a tuneable laser, or using a broad-spectrum optical source associated with a spectrometer. In both cases, the sampling rate obtained is rather low (it rarely exceeds 10 KHz), due to the limits imposed by the tuneable laser tuning frequency or the spectrometer reading speed.

However, many types of perturbations, e.g. those related to vibrations, mechanical stresses or pressure fluctuations, can vary with much greater frequencies, even as high as 100 KHz, so sensors that can guarantee sampling frequencies of hundreds of kHz are required for their measurement. For these types of applications, optical sensors can only be used by implementing interrogation schemes that allow these sampling frequencies to be achieved.

It is acknowledged, e.g. by Fallon, R. W., Zhang, L., Everall, L. A., Williams, J. A. R. and Bennion, I., "All-fibre optical sensing system: Bragg grating sensor interrogated by a long-period grating", *Measurement Science and Technology*, 9 (12), p. 1969 (1998), that a linear filter can be used to derive the wavelength position. However, with this approach, sensors can be developed with a very limited measurement spectrum and are also very sensitive to noise as it is an intensity-based measurement.

In order to achieve a high sampling rate, it is additionally known that an optical interferometer can be used as an interrogator of the optical sensor elements. Unbalanced interferometers have a spectral response consisting of spectral fringes that can be used as waveforms. They can be constructed with free-space optical systems, with integrated optical systems or with optical fibre. Free-space optical interferometers can give very good performance, but they can only be built on bulky optical benches, are very expensive and very sensitive to vibrations. Integrated optical technologies such as silicon photonics, III-V semiconductors or doped glass can be used to realise very compact interferometers. However, these devices have the problem of being polarization-dependent and totally lack versatility, as the operating parameters, such as the free spectral range (FSR), are defined at the construction stage and cannot be changed thereafter, for instance to adapt to different usage requirements. Finally, fiber-optic interferometers have the main advantage that they can be easily built with commercially available components, and the FSR can be adjusted simply by varying the length of the fiber-optic branches.

In U.S. Pat. No. 5,680,489, an optical sensor using sensor elements formed by Bragg gratings is described and in which the interrogation scheme provides for the use of a fiber optic interferometer with Mach-Zehnder architecture. With reference to FIG. 1 attached to the present document, the architecture of the sensor system proposed in U.S. Pat. No. 5,680,489 is schematically shown. A broad-spectrum optical source, 20, is arranged to illuminate a plurality of optical sensor elements, 10, consisting of Bragg gratings, which reflect the signal to an interferometer, 30, realised with Mach-Zehnder architecture, i.e. where an optical coupler sends the signal in parallel to two separate fibre arms, which realise optical paths of different lengths with a well-defined length difference. On one of the two optical fibre branches of the interferometer 30, there is a phase modulator (PM), which receives a signal from a signal generator, 40, and acts as a demodulator of the signals produced by the interferometer. All signals generated by the interferometer 30 reach a receiver, 50, comprising a demultiplator based on wavelength division, 51, detectors, 52a, 52b, . . . , 52n and a processor, 53. The paper also mentions the possibility of replacing the Mach-Zehnder architecture with a Michelson architecture, or other architecture in which the optical beam is split into two distinct beams that have a well-defined difference in relative path length. This technology allows optical sensors to be made with high sampling rates, which are versatile and made from low-cost components that are readily available on the market. However, the interferometer architecture based on the length difference between two distinct optical paths leads to the optical sensor being very sensitive to noise, especially temperature variations.

In Chung, S., Kim, J., Yu, B. A. and Lee, B. "A fiber Bragg grating sensor demodulation technique using a polarization maintaining fiber loop mirror", *IEEE Photonics Technology Letters*, 13 (12), pp. 1343-1345 (2001), a Bragg grating sensor interrogation scheme has also been proposed. Accordingly, the interferometer includes at least one stretch of polarization-maintaining fiber (PMF), as found for example in the Lyot filter or the Sagnac interferometer. However, the practical use of these architectures is limited by the fact that in order for the interrogator to perform signal demodulation, the Bragg grating sensor element must be aligned with the region of maximum slope, which is fixed.

SUMMARY OF THE INVENTION

Purpose of the present invention is to propose a fiber optical sensor that allows for a very high sampling rate, at least in the range of hundreds of kHz.

A further purpose of the present invention is to propose a high sampling rate optical sensor that does not require a particular condition of spectral alignment between the sensor and the interrogator, but in which instead the interrogator is able to extract the spectral position of all sensors wherever they are located with respect to the interferential fringes of the interferometer.

Another purpose of the present invention is to propose an optical sensor with a high sampling rate that is feasible at low cost using commercially available components, and with flexibility to generate any FSR to adapt to situations requiring different responsivity.

It is yet another scope of the present invention to propose a fiber optical sensor that enables high sampling rates and has high accuracy due to reduced noise sensitivity.

The above-mentioned purposes are achieved by means of a fiber optical sensor comprising: optical sensor elements, each adapted to respond to perturbations to which it is subjected by a shift in the spectrum with which said sensor element reflects incident light; a broadband optical source whose spectrum covers the entire sensitivity band of said optical sensor elements; an interferometer; a signal generator; a receiver. The receiver is arranged to receive optical signals from the broadband source; the signal generator is coupled to the interferometer to modulate the signal passing through the interferometer and to the receiver to transmit to it a reference signal; the interferometer and the optical sensor elements are cascaded along the optical path between the broad spectrum source and the receiver, so that the receiver collects a modulated interferometric signal and produces an output signal representative of the wavelength variation undergone by the light reflected by said optical sensor elements when they undergo a perturbation. The optical sensor of the present invention is characterised in that the interferometer comprises at least one polarization-maintaining fiber (PMF), a birefringence modulator and a polarization controller. The birefringence modulator is suitable to receive signals modulated by said signal generator and to modulate consequently with high frequency the phase delay of both polarizations crossing said PMF fiber.

In an optical sensor as outlined above, the optical birefringence in the propagation medium, i.e. in the polarization-maintaining fiber, combined with the birefringence of the modulator, produce the path difference and therefore the interference fringes which, suitably processed according to the known technique, allow the measurement to be traced. The use of a birefringence modulator associated with the polarization-maintaining fiber makes it possible to achieve high-speed modulation of the interferometer, thus allowing high sensor sampling rates.

In conventional optical fiber sensors using interferometers with Mach-Zehnder or Michelson architecture, the fact that the path difference is physically realised in two distinct fiber branches having different lengths causes high sensitivity to noise because each ramp responds differently to noise. In the optical sensor of the present invention, the fact that the path difference is generated within the same stretch of fiber, thus having the same noise response, reduces the sensitivity to noise.

In the optical sensor of the invention, advantageously the receiver is associated with a signal processor, or demodulator, configured to perform interferometer response modulation, allowing the spectral position of the sensor to be derived wherever it is with respect to the interferential fringes of the interferometer.

Also, advantageously, said stretch of PMF fiber makes a closed path so that said interferometer is a Sagnac interferometer. This configuration has the advantage of being polarization independent but requires an internal polarization controller.

Alternatively, the PMF fiber section is connected at the ends forming an angle whereby both polarizations are excited within it, so that the interferometer is a Lyot filter. This configuration necessitates a polarized source and proper 45-degree alignment between several polarization-maintaining fibers, but offers the advantage of not requiring an internal polarization controller.

Advantageously, the birefringence modulator is of the electro-optical type, and more specifically consists of a lithium niobate phase modulator suitable for transmitting both polarizations. This type of modulator can be used as a birefringence modulator because the electro-optical coefficients are very different for each polarization, allowing modulation frequencies in the order of GHz. Such modulators are commercially available at low prices.

Advantageously, the signal generator and demodulator are configured to implement a phase-generated carrier (PGC), pseudo-heterodyne, or quadrature point threshold modulation method.

Advantageously, the sensor elements comprise one or a plurality of multiplexed FBG sensors.

Alternatively, the sensor elements comprise one or a plurality of multiplexed Fabry-Perot cavities. In the case of Fabry-Perot type sensors, the length of the polarization-maintaining fiber must be such that it generates an interferometer FSR parameter approximately equal to the Fabry-Perot type sensor FSR parameter, so that the spectral shifts of the sensor are clearly visible to the interferometer.

Advantageously, the receiver contains a wavelength-division demultiplexing system to separate signals from different optical sensor elements.

BRIEF DESCRIPTION OF THE DRAWINGS

These and other aspects and advantages of the invention will be readily understood from the following description of embodiments of the invention, provided by way of example but not limitation, with the aid of the accompanying drawings, wherein.

DETAILED DESCRIPTION OF THE PREFERRED EMBODIMENTS

Figure 1:
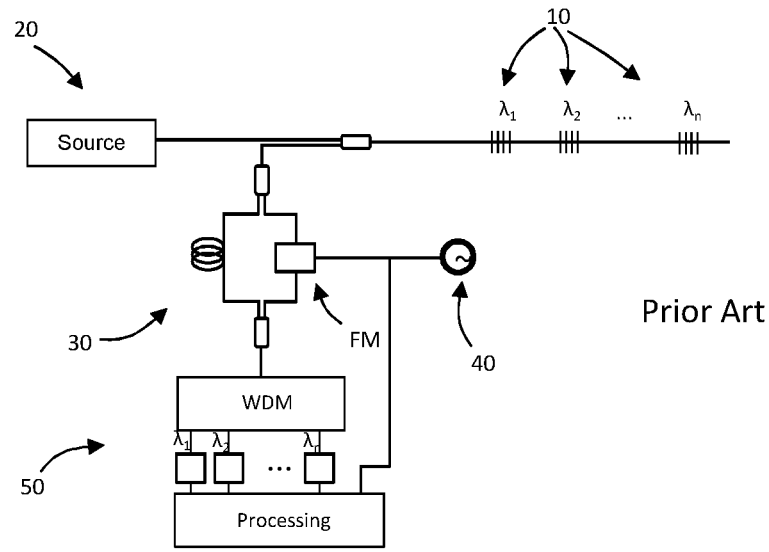
FIG. 1 shows a scheme of the configuration of an optical fibre sensor of known technique.
Figure 2:
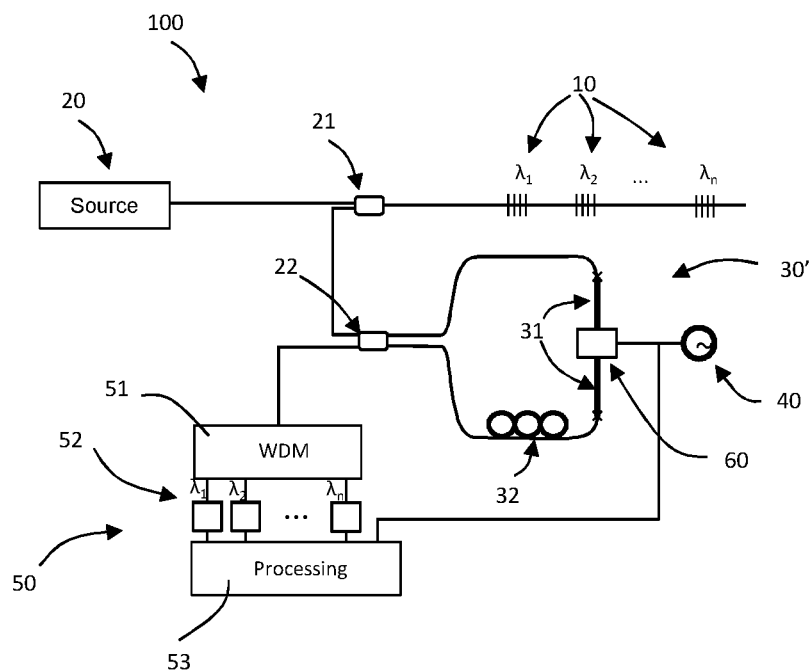
FIG. 2 shows a scheme of the configuration of a first example of an embodiment of a sensor according to the present invention.

With reference to FIG. 2, an optical fiber sensor according to a first embodiment of the present invention is comprehensively referred to as 100. The optical sensor 100 comprises a broadband optical source, 20, which via a coupler, 21, illuminates optical sensor elements, 10, comprising in this embodiment a plurality of multiplexed fiber Bragg gratings. The signal reflected from the sensor elements 10 is transmitted to a Sagnac interferometer, 30', which comprises an optical coupler, 22, at least one polarization-maintaining fiber, 31, of a given length, a polarization controller, 32, and a birefringence modulator, 60. The signal then reaches a receiver, 50 wherein the signal is demultiplexed by a wavelength demultiplier, 51, detected by a plurality of detectors, 52, and then processed by a processor 53. A signal generator, 40, is arranged to send an excitation signal to a birefringence modulator, 60, associated to the polarization-maintaining fiber 31 of the Sagnac interferometer 30 and to send a reference signal to the computer 53. A further embodiment envisages the use of a Sagnac interferometer entirely based on PMF fiber, including the coupler, and in which the polarization control 32 is not present. In this case, indeed, the unbalancing of the interferometer can take place through a splice between two PMF fibers at 90° at a certain distance from the middle of the path of the PMF fiber.

Figure 3:
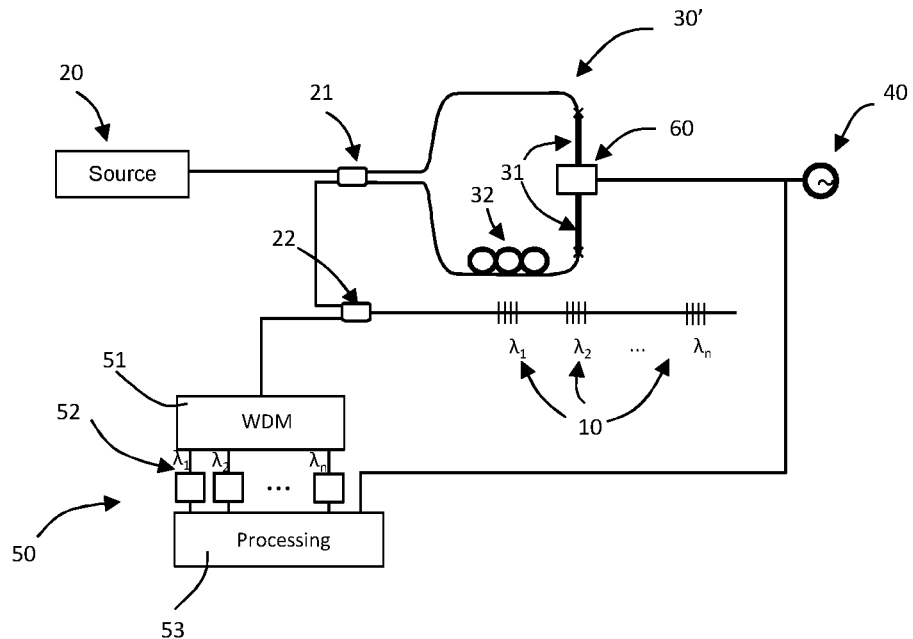
FIG. 3 shows a scheme of the configuration of a second example of an embodiment of a sensor according to the present invention.

With reference to FIG. 3, a second embodiment, 100', of a fiber optical sensor according to the present invention comprises all the same components as the first embodiment, which are therefore shown with the same numerical references. In this case, however, the Sagnac interferometer 30' is arranged upstream of the optical sensor elements 10, between them and the broadband optical source 20. This configuration makes it possible to increase the number of measurement channels using the same interferometer, by inserting a signal divider at the output of the interferometer.

Figure 4:
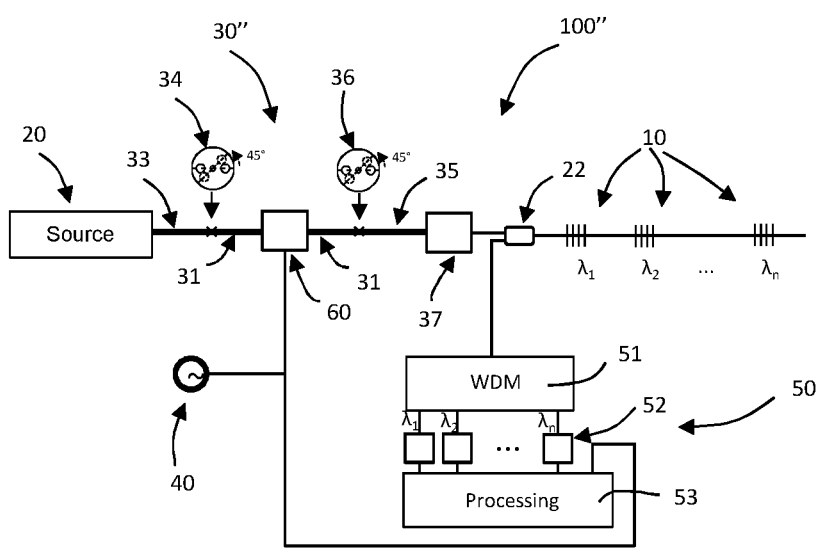
FIG. 4 shows a configuration diagram of a third example of an embodiment of a sensor according to the present invention.

Referring to FIG. 4, a third embodiment, 100", of a fiber optical sensor according to the invention comprises substantially the same components as the previous embodiments and the configuration of the second embodiment in which the interferometer is located upstream of the optical sensor elements 10. In this case, however, the interferometer comprises a Lyot filter, 30" which includes a preceding stretch of polarization-maintaining fiber, 33, a 45° connection, 34, with said at least one stretch of polarization-maintaining fiber 31 of given length, a following stretch of polarization maintaining fiber, 35, connected to said at least one stretch of polarization-maintaining fiber 31 of given length by means of a second 45° connection, 36, and a polariser, 37, arranged at the outlet of said following stretch of polarization-maintaining fiber 35. In this case, the presence of the first coupler 21 is not necessary since the Lyot filter 30" can be directly connected to the broadband optical source 20.

Whether the interferometer consists of the Sagnac interferometer 30' or the Lyot filter 30", the output spectrum has a sinusoidal shape due to the interference between the propagation along the fast axis and the propagation along the slow axis of at least one polarization-maintaining fiber 31 of defined length. In the case where the birefringence modulator is not present, the free spectral field (FSR) of the fringes is equal to:

$$\Delta v_{FSR} = \frac{c}{\Delta n_{PMF} L_{PMF}}$$

Where $\Delta v_{FSR}$ is the fringe spacing in Hertz, c is the speed of light in vacuum, $\Delta n_{PMF}$ is the birefringence of at least one section of polarization-maintaining fiber 31 of given length, and $L_{PMF}$ is its length. Hence, the above equation is valid for both the 30' Sagnac interferometer and the 30" Lyot filter.

The response function of the system depends on the relative position between the fringes and the Bragg 10 gratings: regions around the maximum slope will give the maximum response, while in areas close to the maxima or minima the response will tend to be zero. To avoid response decay, it is necessary to continuously adjust the fringes by moving them back and forth rapidly at a faster rate than the Bragg 10 gratings. This is done in the 30', 30" interferometer due to the presence of the birefringence modulator 60.

In a particularly advantageous embodiment of the invention, a lithium niobate phase modulator 40 that also acts as a birefringence modulator 60 is used as a phase modulator, which exploits the Pockels effect to generate phase modulation that can reach GHz rates. The electro-optical coefficients of lithium niobate are strongly polarization dependent, which makes it possible to generate phase delays greater than π by applying moderate voltages. Specifically, the polarization coefficients of lithium niobate are equal to $r_{33}$=32 pm/V and $r_{31}$=10 pm/V, which correspond to the polarization coefficients aligned ($r_{33}$) and perpendicular ($r_{31}$) to the electric field. When used as a variable delay, i.e. as a birefringence modulator, the response is proportional to the difference between these two values. Therefore, the voltage required to generate a phase delay of π between both polarizations is equal to:

$$V_\pi^{(retarder)} = \frac{r_{33}}{r_{33} - r_{31}} V_\pi^{(phase\,mod)} \cong 1.45\ V_\pi^{(phase\,mod)}$$

Where $V_\pi^{(retarder)}$ is the voltage required to generate a phase delay of π between both polarizations, and $V_\pi^{(phase\ mod)}$ is the voltage that generates an absolute phase change equal to π at the polarization aligned with the electric field (associated with the coefficient $r_{33}$), which is the value given in the nameplate data for this type of phase modulator. In the specific case of lithium niobate, $V_\pi^{(retarder)}$ is only 45% higher than $V_\pi^{(phase\ mod)}$ from the nameplate data, which means that the interference fringes can be shifted as much as necessary by applying reasonable voltage values.

In order to calculate the free spectral field FSR of the fringes of the interferometer 30', 30" including the lithium niobate birefringence modulator 60, it has obviously to be taken into account not only the birefringence of the lithium niobate but also the birefringence of the polarization-maintaining fibers 31, 33, 35. The birefringence values of lithium niobate and PMF fibers have opposite signs when the slow axis is aligned with the electric field in the modulator 60, i.e. in the most typical case, making it easy to compensate for birefringences to generate any desired free spectral field FSR. Mathematically, the free spectral field FSR resulting from the combination of the polarization-maintaining fibers 31, 33, 35 and the birefringence modulator 60 is given by:

$$\Delta v_{FSR} = \frac{c}{\Delta n_{LN} L_{LN} - \Delta n_{PMF} L_{PMF}}$$

where $\Delta n_{LN}$ is the optical birefringence of the birefringence 60 modulator and $L_{LN}$ is its length, while $\Delta n_{PMF}$ is the birefringence of the PMF fibre and $L_{PMF}$ is its overall length. Typically, the birefringence of a suitably chosen birefringence 60 modulator is of the order of magnitude of hundreds of times higher than that of the PMF fiber, therefore whatever free spectral field FSR can be generated by suitably adjusting the length of the PMF fiber.

In a fiber optical sensor according to the present invention as a broad spectrum optical source 20 can be used any source having a spectrum sufficiently broad to cover the spectra of all the optical sensor elements 10 used. For example, spontaneous emission from an Er-doped fiber amplifier or a super luminescent source may be used. The optical sensor elements 10 may be a single sensor element or, more typically, a plurality of multiplexed sensor elements. Each optical sensor element 10 is of a type suitable for responding to perturbations to which it is subjected with a variation of the wavelength with which said sensor element reflects incident light. Particularly advantageous optical sensor elements 10 are Bragg gratings (FBG) and Fabry-Perot cavities. The signal generator 40 is, for example, a signal generator that modulates the interferometer at a high frequency (e.g., over 1 MHz) to allow demodulation of the sensor signal at a frequency over 100 kHz. The output signal from the demultiplier 51 is collected by detectors 52, which may advantageously be photodiodes, such as InGaAs or Germanium type photodiodes connected to a signal amplifier, not shown.

Figure 5:
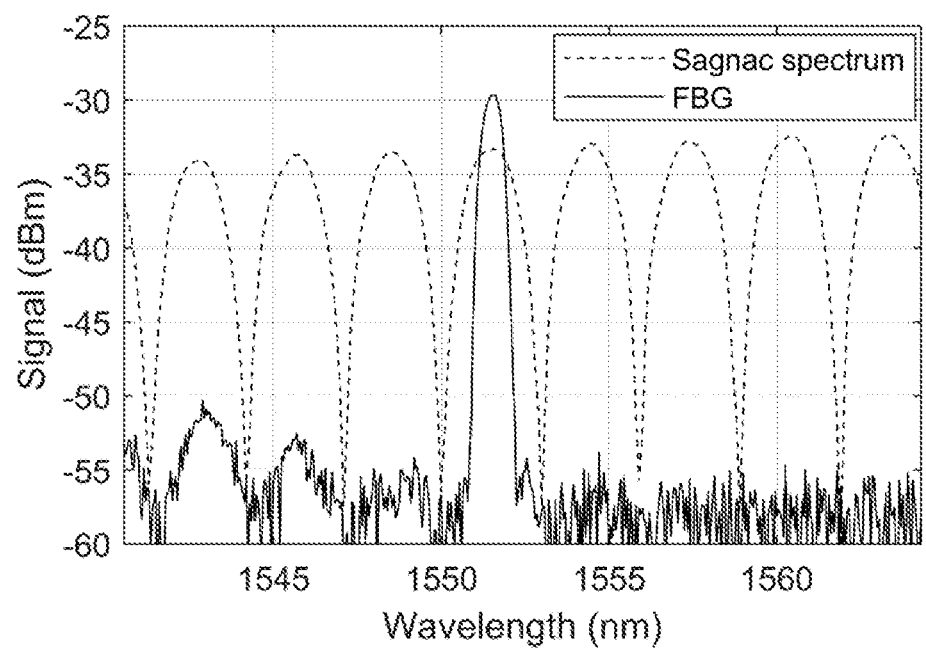
FIG. 5 shows a spectral diagram comparing the spectra of a Sagnac interferometer and an FBG optical sensor element.

With reference to FIG. 5, the spectrum generated by the interferometer 30', 30" together with the related birefringence modulator 60 is shown with dashed line, while the typical reflection spectrum of a typical Bragg grating optical sensor element 10 having a maximum half width (FWHM) of 600 pm is shown with solid line. As can be seen, the bandwidth of the sensor element requires a free interferometer spectral range of at least 1.2 nm to avoid contrast losses in the acquired signal. In the example shown, an FSR free spectral range of 2.95 nm was chosen, which provides a good compromise between range width and responsivity. The interferometer spectrum is shifted rapidly by the birefringence modulator.

Advantageously, wavelength extraction with active modulation from the interferometer is achieved using a phase generated carrier (PGC) scheme. The use of a PGC demodulation is also applicable due to the use of a signal generator 40 emitting a sinusoidal signal.

The specific components discussed above are mentioned only by way of example and not limitation, and on the basis of the foregoing, the skilled person in the art will certainly be able to realize the invention and to implement further variations and modifications of a technical constructional type, without going beyond the scope of protection afforded by the following claims.

The invention claimed is:

1. An optical fiber sensor comprising:
   optical sensor elements each suitable for responding to perturbations to which it is subjected by a shift in a spectrum with which said sensor element reflects incident light;
   a broadband optical source whose spectrum covers an entire sensitivity band of said optical sensor elements;
   an interferometer;
   a signal generator;
   a receiver;
   wherein said receiver is arranged to receive optical signals from said broadband source;
   said signal generator is associated with said interferometer to allow modulation of a signal passing through said interferometer and to said receiver to send a reference signal; said interferometer and said optical sensor elements are cascaded along an optical path between said broadband source and said receiver, so that said receiver receives a modulated interferometric signal and produces an output signal representative of a spectrum shift of the light reflected by said optical sensor elements when they are subject to a perturbation, wherein said interferometer comprises at least one polarization-maintaining fiber and said optical fiber sensor comprises a birefringence modulator associated with said polarization-maintaining fiber and suitable for receiving excitation signals from said signal generator and consequently modulating a phase delay between two polarizations that pass through said polarization-maintaining fiber.

2. An optical fiber sensor according to claim 1 wherein said receiver is associated with a signal processor configured to perform a phase demodulation of a response of said interferometer.

3. An optical fiber sensor according to claim 1 wherein said at least one polarization-maintaining fiber is arranged as a closed loop, so that said interferometer is a Sagnac interferometer.

4. An optical fiber sensor according to claim 1 wherein said at least one polarization-maintaining fiber is connected with its ends rotated one with respect to the other so that both polarizations are excited in it, so that said interferometer is a Lyot filter.

5. An optical fiber sensor according to claim 1 wherein said birefringence modulator is an electro-optical one.

6. An optical fiber sensor according to claim 1 wherein said birefringence modulator is a lithium niobate phase modulator adapted to transmit all polarization status.

7. An optical fiber sensor according to claim 1 wherein said signal generator and receiver are configured to perform a phase generated carrier modulation.

8. An optical fiber sensor according to claim 1 wherein said sensor elements comprise one or more multiplexed fiber Bragg gratings.

9. An optical fiber sensor according to claim 1 wherein said sensor elements comprise one or more multiplexed Fabry-Perot cavities.

10. An optical fiber sensor according to claim 1 wherein said receiver contains a wavelength division demultiplexing system that enables separating the signals from the various sensor elements.

* * * * *